Dec. 20, 1932.      L. MAZZA ET AL      1,891,564
CIRCUIT ARRANGEMENT FOR TELEGRAPHIC APPARATUS
Filed Sept. 10, 1931
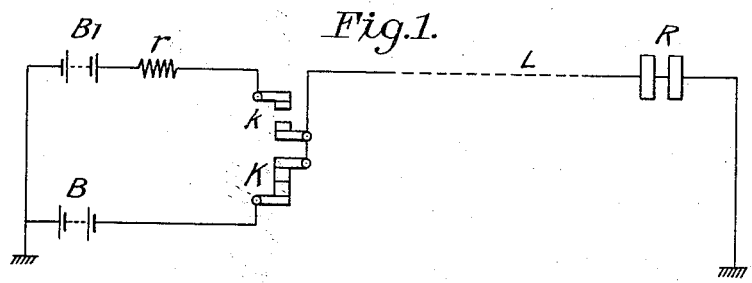
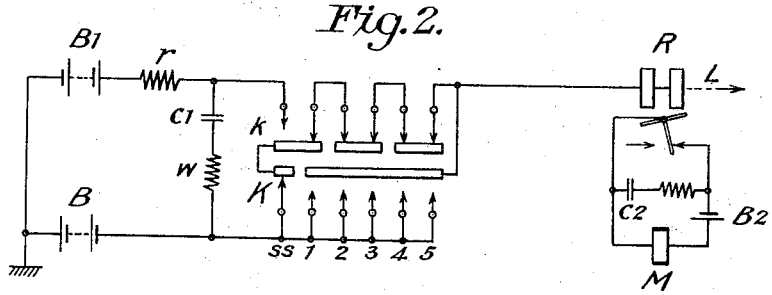
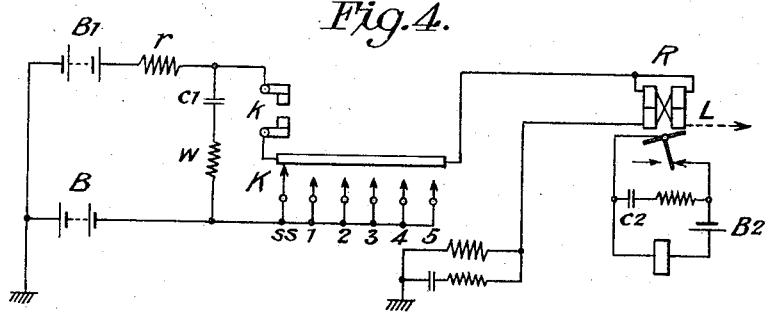
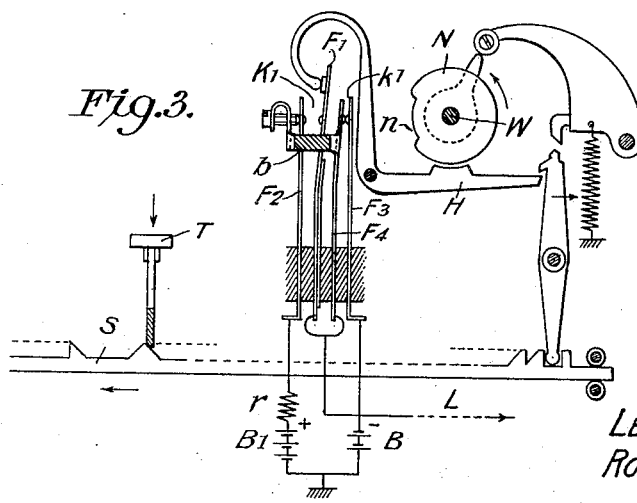
Inventors.
LEANDRO MAZZA and
ROMUALDO REGNONI
By Dowell & Dowell
Attorneys.

Patented Dec. 20, 1932

1,891,564

UNITED STATES PATENT OFFICE

LEANDRO MAZZA, OF FLORENCE, AND ROMUALDO REGNONI, OF ROME, ITALY

CIRCUIT ARRANGEMENT FOR TELEGRAPHIC APPARATUS

Application filed September 10, 1931, Serial No. 562,182, and in Germany March 6, 1930.

The present invention relates to a circuit arrangement for telegraph apparatus with a battery change over, and has for its object to increase the transmission efficiency or the distance that may be traversed and also the speed of telegraphing on long lines. The invention more particularly relates to those telegraph systems in which transmitting currents from two current directions are used. The actual range of use of the invention resides in distance recorders of the start-stop system as are known, for example, by the Morkrum-Kleischmidt teletype.

In the known telegraph systems with battery reversal at the transmitter, an interruption of current takes place when changing over the battery, i. e., for a short period of time neither a positive nor a negative current is transmitted to the line. This is effected in some of the known arrangements by causing the movable contacts of the change over member to interrupt the line circuit when it passes from one contact position into the other contact position. In other known arrangements the batteries are so arranged that their action stops at the moment when the movable contact of the change over member touches both contact positions without interrupting the circuit.

According to the present invention, the change over from the main battery to the auxiliary battery and vice versa is effected without interrupting the current passing through the line. In this manner there is obtained a better form of the signs transmitted, and consequently the transmission efficiency can also be increased. According to the invention, the change over member is so constructed that the main battery always determines the direction of the current and the direction of the current is not reversed until after the main battery has been disconnected from the line. Preferably, the change over member consists of two interrupter contacts of which one is always open in the position of rest. In the circuit of the main battery is included directly one of the interrupters, whilst the other interrupter is included in the circuit of the auxiliary battery together with auxiliary switching means. When changing over the line to the main battery and when returning to the auxiliary battery, the main interrupter located in the circuit of the main battery is closed and then the auxiliary interrupter is opened and vice versa, so that for a short time both batteries are arranged in series. The auxiliary switching means in the circuit of the rest battery are so dimensioned that in this short period of time they prevent the increase in current to an amount which would be deleterious to the batteries. They simultaneously cause the resistance of the main battery relatively to the ohmic resistance of the circuit of the rest battery to be reduced so that the main battery always determines the direction of the current flowing to the line.

An example of construction in accordance with the present invention is illustrated in the accompanying drawing wherein:

Figure 1 diagrammatically shows the principle of the change-over in general;

Figure 2 similarly represents the application of this principle to a start-stop-recorder;

Fig. 3 shows a constructional arrangement for overworking one of the main and auxiliary interrupters; and Figure 4 shows another application of the principle to a start-stop recorder, while at the same time indicating the circuit for duplex communication.

In these illustrative diagrams circuits are assumed in which the line when not in use is connected to the main battery, as in the case for example in the American system with continuous current.

In the arrangement of Fig. 1, B represents the main battery and B1 the auxiliary battery. L indicates the telegraph line to the other end of which there is connected a polarized receiver R. K indicates the main interrupter and $k$ the auxiliary interrupter. Both interrupters are controlled in known manner (not illustrated) by a sending device for example a key board or tape transmitter. Both batteries B and B1 are grounded at opposite poles.

In order to transmit a signal, the auxiliary interrupter $k$ is first closed and the main interrupter K is then opened. At the end of the signal, the main interrupter K is again closed and the auxiliary interrupter k is immediately opened. For a predetermined time interval referred to hereinafter as "t", and which may for example amount to one-tenth of the duration of the transmission of the signal impulse, the batteries B and B1 are consequently connected in series. In the circuit of the rest battery B1 is provided a resistance r, of which the inductance and ohmic resistances are so dimensioned that the time constants of the circuit B, K, k, r, B1 in the aforesaid time interval t prevent the current from rising to an amount which is deleterious to the batteries.

The two batteries B, B1 are so dimensioned that the strength of the current flowing to the telegraph line both when the main interrupter K is opened and when the main interrupter K is closed is substantially the same. Practice has shown that the most favourable conditions are obtained when the ohmic resistance r is about equal to one-fifth of the resistance of the line L and when the auxiliary battery B1 has an E. M. F. which is about one-fifth larger than the E. M. F. of the main battery B.

Fig. 2 shows the application of this change-over system or device for distant recorders of the start-stop system, which are conventionally operated on a five letter alphabet whereby five current impulses necessary for transmitting a signal are preceded by a current impulse for start and are followed by a current impulse for stop. With the current start impulse, the receiver is started and by the current stop impulse is stopped again so that there is always a synchronism for each signal.

In the arrangement shown in said Fig. 2 there are consequently six interrupter contacts K with corresponding auxiliary interrupter contacts k. The first interrupter ss serves for the transmission of the start and the stop current impulses, while the interrupters 1 to 5 are used for the transmission of the current impulses of the five letter alphabet.

In parallel with the interrupter contacts is a condenser c1 and a resistance w, which in the known manner serves to eliminate sparks. Further, at the outgoing end of the line there is also shown the polarized receiving relay R, which transmits received current impulses to the receiving apparatus M. Under circumstances during transmission, this portion of the circuit is unnecessary. The receiver nevertheless remains connected to the transmission for local control.

Fig. 3 exemplifies a structural arrangement including a pair of contacts K1, $k^1$ operable to effect the transmission according to this invention. Special cam disks N, one for the start and stop impulse and five for the selective impulses are mounted on a shaft W of the sender, which, in known manner, is coupled with a drive motor (not shown) in conjunction with the pressing or operating key T. Said Fig. 3 however shows only one such cam disk, namely, that for the first selective impulse. On depressing the key T, the combination bars S are actuated and the lever H thereby released. Only one bar S and the associated lever H is here shown, the same being that which corresponds to the first selective impulse, that is, to the second current impulse to be sent out.

In the rotation of the shaft W, the lever H drops into the depression n within the cam disk N and releases the contact spring f1 of the contact K1. This spring f1 moves toward the left, contacts with the spring $f^2$ and forces it likewise toward the left. The spring $f^2$ is connected by a bridge b with the spring $f^4$ of the interrupter contact $k^1$. Therefore, upon said movement of the spring $f^2$ the spring $f^4$ will be carried along with it and disengage from the spring $f^3$, so that contact $k^1$ will be opened. For a short period of time, both contacts $K^1$ and $k^1$ are thereby closed. As soon as the lever H is again raised by the cam disk N, the spring $f^4$ is repressed against the spring $f^3$ and then spring $f^1$ will remove from spring $f^2$, so that both contacts $k^1$ and $K^1$ are again closed for a short period of time.

The operation of the connection shown in Fig. 2 is as follows: Assuming that a signal is to be transmitted consisting of a letter, such for example as Z, denoted by three positive current impulses at the 1st, 2nd and 5th phases and two negative impulses at the 3rd and 4th phases, the interrupter kss is closed for the transmission of the start current impulse. After the time interval t, the main interrupter Kss is open. At the commencement of the first of the five selective impulses, the interrupter K1 is closed and thereupon after the time interval t, the auxiliary interrupter k1 is opened. At the end of this first selective impulse or phase, the main interrupter K1 is opened and at the same time the main interrupter K2 is closed. These operations respectively precede and follow respectively the closing of the auxiliary interrupter k1 and the opening of the auxiliary interrupter k2. In similar manner, the further selective impulses or phases of the current impulses are transmitted consecutively. In the seventh phase or impulse, the interrupter Kss is again closed for transmitting the stop signal and subsequently the auxiliary interrupter kss is again opened. The control of the auxiliary interrupter k is preferably effected positively and mechanically with the operation of the main interrupter K by means such as shown for example in Fig. 3.

In the arrangement shown in Fig. 4 only a single auxiliary interrupter k is provided for all the interrupters K$ss$, K1, K2, K3, K4, K5. In this case it is not possible to accurately maintain the time interval $t$ for the simultaneous closing of both interrupters in each phase of the current impulses as the time necessary for the transmission of a phase is also added. However, the time interval $t$ is always smaller than the time required for transmitting a signal.

In the aforesaid Fig. 4 is also shown a circuit with a double differential relay at the receiving end of the line as used in the known manner for duplex operation for which the invention is particularly suitable by reason of the omission or elimination of any interruption in the current passing through the line.

We claim:—

1. In a telegraph apparatus, a telegraph line, a main battery connected to said line, an auxiliary battery also connected to said line and both batteries being grounded at opposite poles, a sending device for transmitting current impulses over said line, means controlled by said sending device for changing over the line from the main battery to the auxiliary battery and vice versa without interrupting the current passing through said line at each operation of the sending device.

2. A telegraph apparatus comprising a telegraph line, a main battery connected to said line, an auxiliary battery also connected to said line and both said batteries being grounded at opposite poles, a sending device for transmitting current impulses over said line, means controlled by said sending device for connecting and disconnecting the auxiliary battery to the line, means for connecting and disconnecting the main battery to said line, means for actuating the aforesaid means for connecting the auxiliary battery before actuating the means for disconnecting the main battery and means for actuating the means for connecting the main battery before actuating the means for disconnecting the auxiliary battery.

3. In a telegraph apparatus, a telegraph line, a main battery connected to said line, an auxiliary battery also connected to said line and both said batteries being grounded at opposite poles, a sending device for transmitting current impulses over said line, means controlled by said sending device for changing over the line from the main battery to the auxiliary battery at each operation of the sending device, means for closing the connection of the auxiliary battery to said line for a period of time amounting to one-tenth the duration of a current transmission before the interruption of the connection of the main battery to the line, and means for closing the connection of the main battery to said line for a period amounting to one-tenth the duration of the current transmission before the interruption of the connection of the auxiliary battery with said line.

4. In a telegraph apparatus, a telegraph line, a main battery connected to said line, a main interrupter, an auxiliary battery also connected to said line and both said batteries being grounded at opposite poles, an auxiliary interrupter, and additional switch means for preventing the increase of current to an amount deleterious to the batteries when closing the main interrupter and the auxiliary interrupter for a duration of one-tenth of the current transmission.

5. In a telegraph apparatus, a telegraph line, a main battery connected to said line, a main interrupter, an auxiliary battery also connected to said line and the two batteries being grounded at opposite poles, an auxiliary interrupter, and accessory switch means in the circuit of the auxiliary battery and of the auxiliary interrupter; said accessory switch means having a much greater resistance than the main battery.

6. In a telegraph apparatus, a telegraph line, a main battery connected to said line, a main interrupter, an auxiliary battery also connected to said line and both said batteries being grounded at opposite poles, an auxiliary interrupter and additional switch means in the circuit of the auxiliary battery and of the auxiliary interrupter, the ohmic resistance of these additional means being about one-fifth larger than the ohmic resistance of the telegraph line and the auxiliary battery being about one-fifth larger than the main battery.

7. A telegraph apparatus of the start-stop type, comprising in combination, main interrupter contacts, auxiliary interrupter contacts one for each main interrupter contact, an auxiliary battery having additional switch means through which it connects to the auxiliary interrupter contacts, a main battery connected to the main interrupter contacts and both of said batteries being grounded at opposite poles, a telegraph line connected to the main interrupters and to the auxiliary interrupters, and a sending device for transmitting a group of current impulses over said line for each letter and numeral; said device controlling said main and auxiliary interrupters to change-over the line from the main battery to the auxiliary battery at each transmission of a current impulse without interrupting the current passing through said line.

8. In a telegraph apparatus of the start-stop type, a plurality of main interrupter contacts, an auxiliary interrupter contact, an auxiliary battery having switch means through which it is connected to the auxiliary interrupter contact, a main battery connected to the main interrupter contacts; both of said batteries being grounded at opposite poles, a telegraph line connected to the main interrupters and the auxiliary interrupter, and a sending device for transmitting a group of current impulses over said line for each letter and numeral; said device controlling said main interrupters and said auxiliary interrupter to change-over the line from the main battery to the auxilary battery and vice versa without interrupting the current passing through said line at each transmission of a current impulse.

LEANDRO MAZZA.
ROMUALDO REGNONI.